United States Patent
Müller

[11] 3,838,605
[45] Oct. 1, 1974

[54] DRIVE BELTS FOR USE WITH MULTIPLE PULLEYS

[75] Inventor: Alexander Müller, Hoxter, Germany

[73] Assignee: Hoxtersche Gummifadenfabrik Emil Arntz KG, Hoxter, Germany

[22] Filed: Mar. 19, 1973

[21] Appl. No.: 342,548

[30] Foreign Application Priority Data
Mar. 20, 1972  Germany.............................. 2213424

[52] U.S. Cl. ................................................ 74/234
[51] Int. Cl. ............................................ F16g 5/00
[58] Field of Search ....................................... 74/234

[56] References Cited
UNITED STATES PATENTS
2,728,239  12/1955  Adams, Jr. ......................... 74/234 X FOREIGN PATENTS OR APPLICATIONS
1,241,508  8/1960  France ................................. 74/234
720,344  12/1954  Great Britain ....................... 74/234

Primary Examiner—Leonard H. Gerin
Attorney, Agent, or Firm—Mason, Mason & Albright

[57] ABSTRACT

Multiple V-belts are joined together by a web which has a reinforcing fibrous layer at least 50 percent of the fibres of which are orientated in a selected direction. The fibres may be polyamide, polyester or cotton and are embedded in an elastomer.

7 Claims, 2 Drawing Figures

DRIVE BELTS FOR USE WITH MULTIPLE PULLEYS

BACKGROUND OF THE INVENTION

1. Field of the Invention

This invention relates to driving belts which are intended for use on multi-grooved pulleys.

2. Description of the Prior Art

Multiple wedge belts are particularly suitable for power transmission where abrupt changes of loading occur, for example for transmissions in which the belts have to perform the function of clutching and declutching a drive by tensioning and detensioning. Experience has shown that in a drive system with a plurality of single belts independent of one another, this mode of operation causes flapping, vibration and twisting of the belts and leads to their premature destruction.

The co-operation of the individual belts is also affected by unavoidable manufacturing tolerances and wearing of the pulley grooves. As a result, under tensile stress the belts lie differently in the grooves and consequently the belts tend to lead or lag behind one another. A web interconnecting the individual belts has the function of opposing a resilient resistance to the relative movements of the belts and of taking up the shear forces that result from this and so transmitting these forces that the belts are co-ordinated in their behaviour and co-operate as a unit in their overall operation.

When travelling around the pulleys the web is located in a radial sense beyond the neutral layer which is determined by the tension element and is located in the region of the grooves formed between the individual belt bodies. Above this layer, therefore, expansion forces in the direction of the length of the belt occur to an extent which increases in the radial direction outwards, and thus occur more particularly in the web. Consequently, complementary transverse forces are set up in the web and tend to decrease the distance between the individual belt bodies.

Now, the web must be so formed that under these different loadings it can perform the function of allowing the individual belt bodies sufficient individual movement for adaptation to inaccuracies of the grooves and ensuring their co-operation as a unit.

In one previously proposed construction, cord threads are embedded in the elastomer layers of the web and are substantially perpendicular to the length direction of the belt.

In another previously proposed belt the cord filaments are replaced by a fabric of which the warp threads and the weft threads are inclined to the length direction of the belt. When such a belt is subjected to a tensile force, transverse forces are also set-up in the fabric because of the "folding fence effect" and tend to bring the individual belt bodies closer together.

An object of the invention is so to construct a multiple belt that despite the tensile forces set-up in the web, the individual belt bodies retain sufficient individual movement to enable them to adapt themselves to inaccuracies of the pulley grooves, without, however, impairing the unity of the belt.

SUMMARY OF THE INVENTION

According to the present invention, there is provided in a drive belt, a plurality of generally wedge-section bodies, and a web interconnecting the said bodies, said web incorporating a fibrous layer at least 50 percent of the fibres of which are at an angle in the range of from 45° to 90° to the length direction of the belt.

The required transverse and longitudinal extensibility of the web and its transverse rigidity can be appropriately affected by the choice of the fibre thickness and of the proportion of the orientated fibres in the direction of the various forces.

According to a further feature the fibrous layer comprises preferably a polyamide, a polyester, or cotton.

Preferably the web comprises natural or synthetic elastomers.

According to a further advantageous feature an additional fibrous layer is located in or in the region of the outer layer of the web.

According to a further feature the main direction of the fibre orientation of the fibrous layers is the same.

BRIEF DESCRIPTION OF THE DRAWINGS

An embodiment of a drive belt in accordance with the invention will now be described, by way of example only, with reference to the accompanying diagrammatic drawings, in which.

DESCRIPTION OF THE PREFERRED EMBODIMENT

Figure 1:
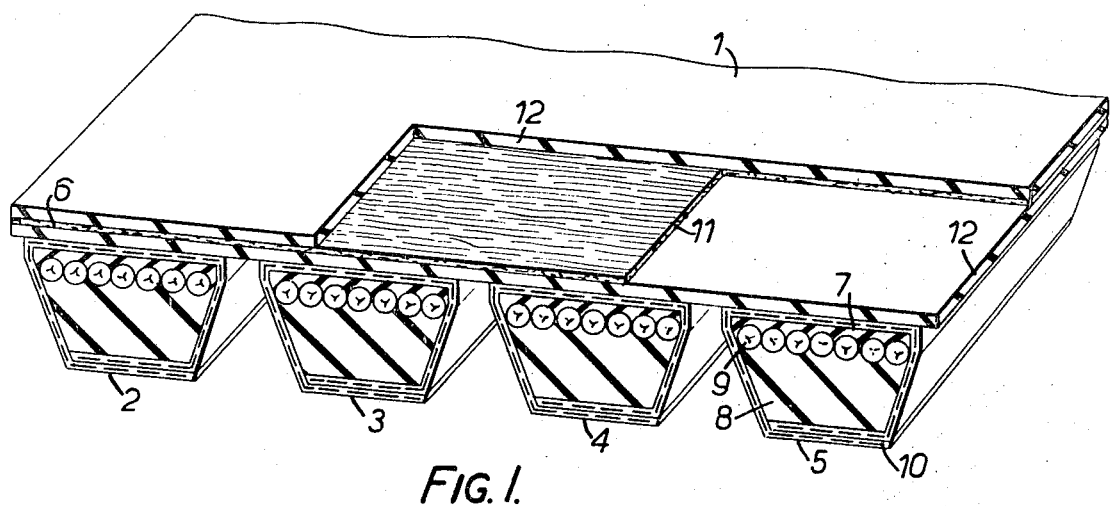
FIG. 1 is an isometric view of part of a preferred embodiment of a drive belt in accordance with the invention, in which parts of an interconnecting web are shown exposed in order to illustrate the details more satisfactorily.

In FIG. 1 the drive belt in accordance with the invention comprises a plurality of wedge-shaped (trapezoidal) individual belt bodies, for example four such bodies 2 to 5, which are interconnected at the outer surface of each body by a web 6. Each of the bodies 2 to 5 has an outer section 7 which is subjected to tensile stress when the belt bends around a pulley, and an inner section 8 which is simultaneously subjected to a compressive stress.

Twisted, rope-like, cords at a position adjacent the web 9 acting as tension elements are incorporated in each belt body and these cords are primarily of natrual or synthetic elastomers. Each of the bodies 2 to 5 is surrounded by a protective fabric 10, which, however, can be wholly or partly omitted.

The web 6 comprises a fibre hide 11 or other fibrous layer embedded between elastomer layers 12 and consisting of polyamide fibres which are predominantly oriented transversely to the length direction of the belt, that is, at least 50 percent of the fibres of the hide are orientated and the direction of the fibre orientation lies at an angle in the range of 45° to 90° to the length direction of the belt.

It is possible to use hides of which the fibres are polyester or cotton. It is also possible to incorporate more than one fibre hide.

Figure 2:
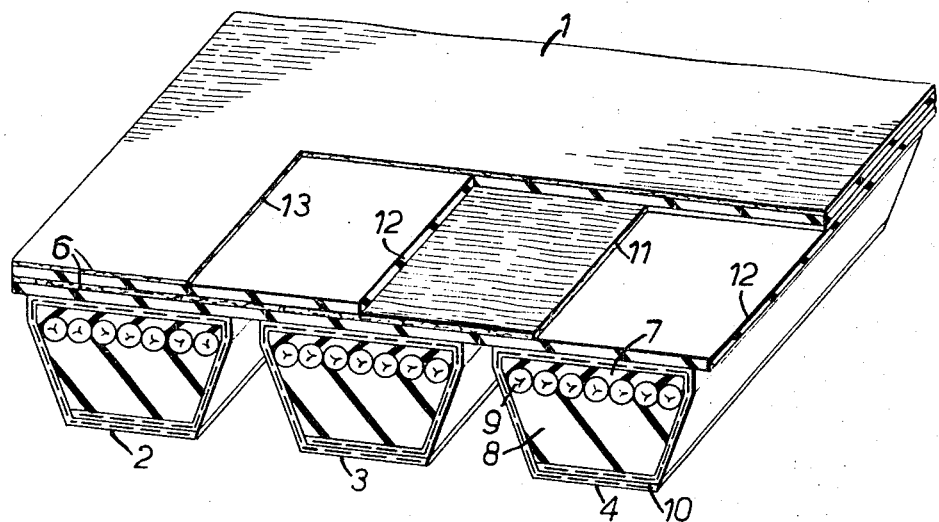
FIG. 2 illustrates a modification of the embodiment of FIG. 1.

FIG. 2 shows a modification with an additional fibre hide 13 or other fibrous layer which is incorporated in the outer layer of the web 6 and of which the fibres also extend transversely to the length direction of the belt. The fibres may consist of the same material, for example a polyamide, as in the case of the fibre hide lying between the elastomer layers 12. It is also possible to use other suitable material, for example a polyester, if this appears advisable. Also, the predominant directions of fibre orientation in the two fibre hides may be the same or they may be at an angle to one another.

The fibre hide arranged on the outside of the web 6 in FIG. 2 consists preferably of polyamide fibres and its essential function is to protect the outside of the belt against wear and to render it capable of slipping. This is advantageous in multi-belt drives in which a clutch is not used and power transmission by the belt is effected or interrupted respectively by contact pressure of a tensioning roller or by release of this pressure. The travelling belt is first detensioned by the release of the tensioning roller and then brought by supporting devices into a configuration such that the belt is lifted sufficiently from the grooves, more particularly those on the driving pulley, that no further power transmission can take place and the belt and the driven pulley come to a standstill. The engagement process is effected by contact pressure of the tensioning roller and re-establishment of the driving connection between the belt and the pulley grooves.

In both processes, the cessation and more or less abrupt commencement of power transmission causes considerable frictional stress between the contact surfaces of the supporting devices and of the tensioning roller on the one hand and the outer surface of the belt on the other, and for this reason this surface is protected and made more capable of slipping by the fibre hide 13.

The special economic advantage of the use of a hide or other fibrous layer arises from the fact that manufacture of this fibrous layer involves no costly working operations as in the case in various previously proposed working processes, yarns made from fibres are made into threads an then into cords, rough cord fabrics or full fabrics.

Since the elastomer of the web can not only penetrate into the interspaces of the fibrous layer but can also surround the monofilamentary fibres on all sides, an extremely satisfactory adhesion can be obtained between the fibrous layer and the elastomer, and this is of great importance for the durability of the web.

I claim:
1. In a drive belt,
   a plurality of generally wedge-section bodies, and
   a web interconnecting the said bodies, said web incorporating
   a fibrous layer at least 50 percent of the fibres of which are orientated at an angle in the range of from 45° to 90° to the length direction of the belt.
2. A belt according to claim 1, wherein the fibres are of polyamide.
3. A belt according to claim 1, wherein the fibres are of polyester.
4. A belt according to claim 1, wherein the fibres are of cotton.
5. A belt according to claim 1, wherein the web comprises an elastomer.
6. A belt according to claim 1, comprising an additional fibrous layer in the web.
7. A belt according to claim 6, wherein at least 50 percent of the fibres of the additional fibrous layer are orientated, the direction of orientation being the same as for the first mentioned fibrous layer.

* * * * *